E. A. JEFFERY.
Griddle.
No. 68,202.           Patented Aug. 27, 1867.
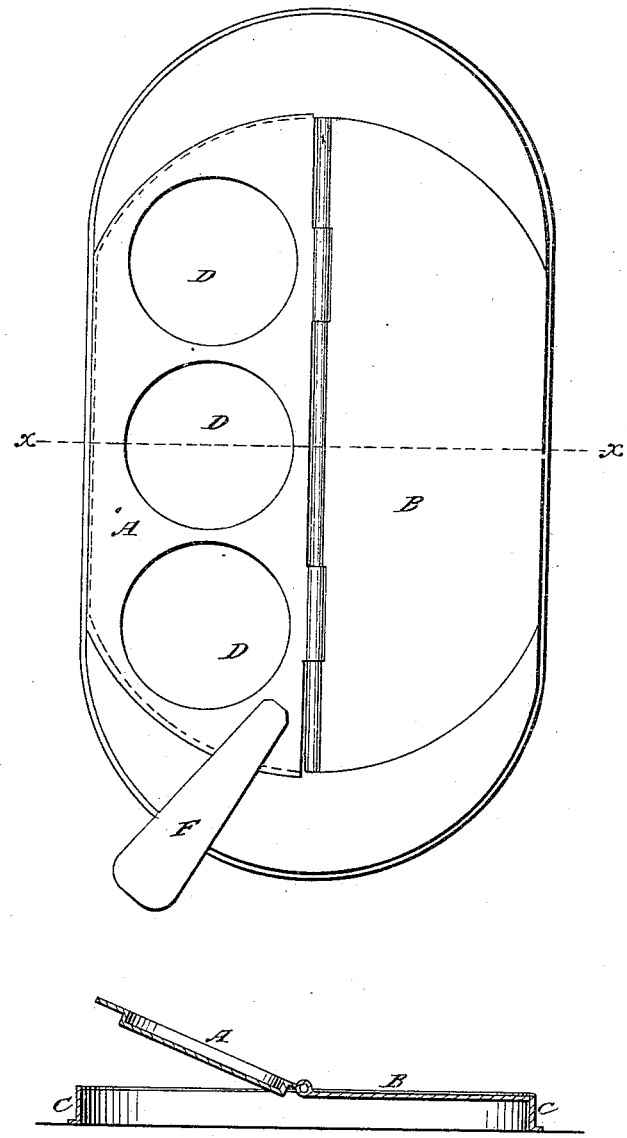

United States Patent Office.

EDWIN A. JEFFERY, OF TRAPPE, MARYLAND, ASSIGNOR TO HIMSELF AND GEORGE M. CLARK, OF THE SAME PLACE.

Letters Patent No. 68,202, dated August 27, 1867.

IMPROVEMENT IN GRIDDLES.

The Schedule referred to in these Letters Patent and making part of the same.

TO ALL WHOM IT MAY CONCERN:

Be it known that I, EDWIN A. JEFFERY, of Trappe, in the county of Talbot, and State of Maryland, have invented a new and useful Improvement in Griddles; and I do hereby declare that the following is a full, clear, and exact description thereof, which will enable others skilled in the art to make and use the same, reference being had to the accompanying drawings, forming part of this specification.

This invention relates to a new and improved method of constructing griddles for baking cakes, and it consists in making the griddle in two separate parts, one of which parts is reversible and the other stationary, and in forming recesses in one of the parts, and in raising the surface of the griddle from the stove by a rim and flange, as will be hereinafter more fully described.

Figure 1 is a plan or top view of the griddle, and

Figure 2 is a cross-section through the line $x\ x$.

Similar letters of reference indicate like parts.

The griddle is formed of two parts, A and B. They are attached to a rim or flange, C, which flange raises the parts of the griddle a sufficient distance above the stove to allow a chamber or space for hot air beneath. The part A of the griddle has recesses for the cakes, marked D, which recesses may be circular or of any other desired shape, and of a depth sufficient for the thickness of the cakes. This part, A, is hinged to B, which allows it to be reversed or turned bottom side up. F is a handle by which the part A may be operated.

In using the griddle the batter is placed in the recesses D, and when the under side is sufficiently baked the part A is reversed, and the partially-baked cakes are thereby turned and deposited upon the part B, where the baking is completed. After turning the cakes the part A is turned back and the recesses are filled again, and the operation is repeated and continued as long as may be desired.

What I claim, and desire to secure by Letters Patent, is—

The combination of the rim C, fixed plate B, hinged plate A, having recesses D, constructed substantially as described, for the purpose specified.

EDWIN A. JEFFERY.

Witnesses:
D. H. JEFFERY,
M. M. CLARK.